Nov. 21, 1961     J. L. STRAUGHN ET AL     3,009,826
PROCESS OF FORMING A DISPERSION OF AEROSOL PARTICLES
AND PROCESS FOR COATING SOLID PARTICLES
WITH SAID DISPERSION

Filed May 24, 1957     2 Sheets-Sheet 1

INVENTORS
JOHN L. STRAUGHN
WILLIAM B. TARPLEY, JR.

BY Arthur H. Seidel

ATTORNEY

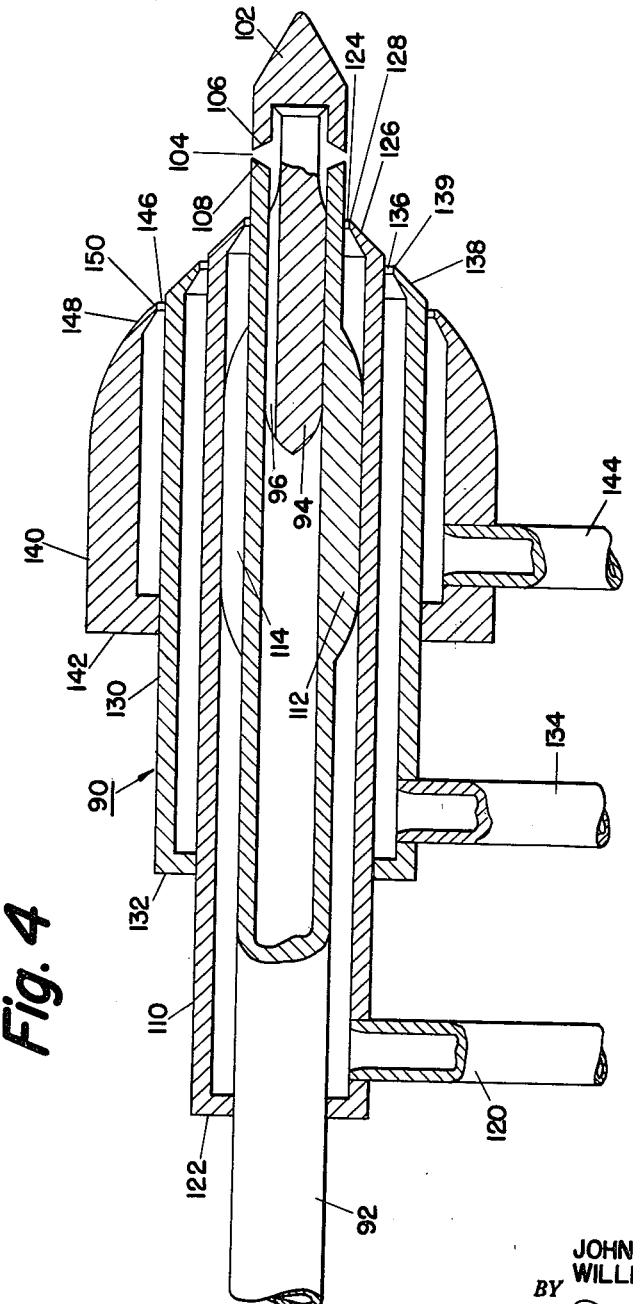

United States Patent Office 3,009,826
Patented Nov. 21, 1961

3,009,826
PROCESS OF FORMING A DISPERSION OF AEROSOL PARTICLES AND PROCESS FOR COATING SOLID PARTICLES WITH SAID DISPERSION
John L. Straughn and William B. Tarpley, Jr., West Chester, Pa., assignors to Aeroprojects, Inc., West Chester, Pa., a corporation of Pennsylvania
Filed May 24, 1957, Ser. No. 661,507
13 Claims. (Cl. 117—100)

The present invention relates to a method for simultaneously dispersing and/or coating a plurality of materials comprising liquids and/or solids.

The uniform and facile coating of a plurality of materials, such as the coating of finely divided solid particles of a size of no more than 200 microns and no less than about 1 micron with the same size or smaller particles of liquids, or the coating of such finely divided solid particles with the same size or smaller particles of solids, or the coating of finely divided liquid particles of a size of no more than 200 microns and no less than about 1 micron with the same size or smaller particles of solids, has not heretofore been satisfactorily accomplished. Thus, in the case of the coating of finely divided solid particles with the same size or finer powders or liquids, it has been suggested to coat pulverized or particulate solids by spraying such solids with the same size or finer powders or liquids, while the solids are moved in respect to the finer powders or liquids, as on a conveyor belt. Such techniques and other suggested methods for contacting powders with powders or liquids have not proven satisfactory for obtaining a uniform coating of the powder or liquid upon the solids being coated. Moreover, such techniques are wasteful of materials, and are difficult to operate; particularly when the solids intended to be coated are very finely divided solids.

Similar problems have beset prior methods for the coating of finely divided liquid particles with solid powders and the formation of stable useful slurries. Thus, the utility and desirable properties of many types of slurries are a function of the intimate degree of mixing used to achieve such slurries. This is particularly true in the case of many types of slurries comprising very finely divided solid particles.

The present invention has as an object the provision of a method for coating one finely divided material upon another finely divided material, with the material being coated having a particle size of from 1 to 200 microns.

The present invention has as another object the provision of a method for simultaneously dispersing finely divided liquids and/or finely divided solids.

The present invention has as a further object the provision of a method for coating a finely divided meltable or non-meltable solid of a particle size of 1 to 200 microns with finely divided liquid particles of aerosol dimensions, and of the same size or smaller than the particles being coated.

The present invention has a still further object the provision of a method for coating a finely divided liquid or solid of a particle size of 1 to 200 microns with finely divided meltable solid particles of aerosol dimensions, and of the same size or smaller than the liquid particles being coated.

The present invention has as another object the provision of a method for forming intimately mixed slurries.

Other objects will appear hereinafter.

The process of the present invention is broadly applicable to the simultaneous dispersion of a wide variety of finely divided solids and liquids. Thus, the present invention may be used for coating finely divided solid powders of a particle size of 1 to 200 microns of materials which are non-meltable with non-reacting liquid particles of aerosol dimensions. For example, the present invention may be used to change the electrostatic properties of a wide variety of solids as by coating such solids with any one of a variety of proprietary materials such as the liquid sold by Armour & Company, Chicago, Illinois, designated "Arquad S," a dialkyl diethyl ammonium chloride, or the liquids "Zelec DX," a complex organic cationic compound having a pH range of five to seven, and "Zelec NE," an anionic composition of alcohol phosphates, sold by the Organic Chemicals Department of E. I. du Pont de Nemours, Wilmington, Delaware. Thus, finely divided silica particles, such as are used as an additive in the manufacture of white-side-wall automobile tires, may have their electrostatic characteristics advantageously affected by being coated with any one of the aforementioned materials. Silica particles coated in this manner are far more readily dispersible in rubber compound matrices, as reagglomeration of the silica particles is avoided.

The present invention may be utilized for the coating of liquids with meltable solids, as for example, the coating of particles of vitamin oils of a size of 1 to 200 microns with smaller particles consisting of aerosolized particles of meltable wax to yield tiny beads of vitamin concentrate surrounding by wax.

The present invention may be utilized for the coating of finely divided solids with meltable solids, as for example, the coating of unstable organic compounds (such as hygroscopic compounds) with a water-proofing wax.

The present invention is generally applicable, as indicated above, to many varieties of powders. Thus, dry silver halide powders, such as finely divided silver bromide or silver chloride, talc, and finely divided barium sulfate are wet with but great difficulty by conventional methods but can be uniformly coated with liquids by the present invention. Similarly, a wide variety of dried and dehydrated food particles such as milk powder, coffee powder, starch powder, and the like can be uniformly coated with liquids and reconstituted by the process of the present invention, with the formation of unsightly lumps being avoided. This facilitates the use of such materials in vending machines and devices where rapid and neat reconstitution is desirable.

The process of the present invention is also applicable to froth flotation purposes and may be used to effect the preferential wetting of finely divided particles such as wetting agents, frothing agents, and floating agents with liquids such as water.

The process of the present invention enables the formation of finely divided suspensions in those cases where the wetting, frothing or floating agent has a limited solubility in water. The process of the present invention also ensures intimate engagement between the particles being worked on and the wetting, frothing, or floating agent.

The process of the present invention is applicable to the coating of crushed oil seeds with water or a variety of organic solvents, in which rupturing of the cells comprising the oil seeds is effected to thereby bring about an extraction or an emulsification of the oily constituents. Not only may the process of the present invention be used for the treatment and extraction of crushed oil seed, but also the process of the present invention may be used for the extraction of oil from finely divided shale particles, and the extraction of valuable vitamins, such as vitamin B–12, from biological sources, such as the dried municipal sewage by-product known as Milorganite.

The present invention is also widely applicable to the coating of meltable solids with relatively non-meltable solids, such coating being effected while the meltable solid is in the liquid state. For example, the subject invention is applicable to the coating of minute wax particles with flour dust and other dusts which prevent the wax particles from tending to agglomerate or stick together. Thus, the finely divided dust particles may be intimately mixed with finely divided molten wax particles, which on cooling results in finely divided dust-coated wax particles.

The present invention may be used for the preparation of a wide variety of stable slurries and colloidal dispersions of solids and liquids, and of liquids and liquids; such as slurries of metal particles or inert solids such as silica, clays, or organic solids in water or other liquids; or dispersions of water and oils, liquid fats, etc.

The present invention comprehends the coating or dispersion of particles in the aerosol size range, and is therefore applicable to any solid or liquid which may be aerosolized. True aerosols have a particle size range of the order of 60 microns in diameter, or smaller; preferably below 10 microns, and represent an intermediate stage between the coarsely dispersed state and atomic or molecular particle size.

As heretofore indicated, the particles being coated may be somewhat larger than aerosol dimensions, and may be of a size of up to 200 microns.

For the purpose of illustrating the invention there is shown in the drawings forms which are presently preferred; it being understood, however, that this invention is not limited to the precise arrangements and instrumentalities shown.

Referring to the drawings wherein like reference characters refer to like parts:

FIGURE 1 is a schematic view of one apparatus embodiment of the present invention.

FIGURE 2 is one nozzle embodiment of the present invention which may be used in the apparatus embodiment shown in FIGURE 1.

FIGURE 3 is a sectional view of another nozzle embodiment of the present invention.

FIGURE 4 is a sectional view of another nozzle embodiment of the present invention.

Referring to the drawings, and initially to FIGURE 1, the propellent gas is introduced into the system through line 10. Air may be used as a propellent gas with many materials without any interreaction being encountered between the air and the materials. However, where the materials are readily oxidizable, and interreaction between the gas and the remaining materials is to be avoided, inert gases such as nitrogen, helium, argon, neon, fluorinated and chlorinated methane and heavier hydrocarbon derivatives, such as dichlorodifluoromethane, dichloromonofluoromethane, methylchloride, trichloromonofluoromethane, 1,1,1-trichloro-2,2,2-trifluoroethane and other inert propellent gases may be used.

The propellent gas passes from line 10 through gas pump 11, wherein it is pressurized to above about 1.5 atmospheres, preferably above 1.7 atmospheres, and then passes through pressure gauge 12 and valve 14 into heat exchanger 16. Within heat exchanger 16 the gas temperature may be raised to the intended temperature level. In those forms of the process of the present invention in which it is not desirable to heat the propellent gas above ambient temperature conditions, heat exchanger 16 can be eliminated. From heat exchanger 16 the gas passes through temperature gauge 18 which permits visual observation of the gas temperature, and then into nozzle means 20.

In the illustrated embodiment, a liquid is being coated upon a solid so that a liquid conduit line 22 and a solid conduit line 24 are provided.

The liquid, which may be any liquid which can be aerosolized, is passed to liquid conduit line 22 from liquid storage vessel 26. Vessel 26 may include means for heating the liquid therein, such means being diagrammatically designated 28. Within line 22 the liquid from liquid storage vessel 26 is metered by means of pump 32, which may, if desirable, elevate the pressure sufficiently to effectuate delivery by the nozzle 20. The liquid within liquid conduit line 22 may be heated still further by means of heater 34, which may comprise conventional heat-exchange means. From heater 34 the liquid passes through temperature gauge 36 and then into nozzle means 20.

The solids for the system, which may comprise any finely divided solids, having a particle size of from 1 to 200 microns are introduced into solids conduit line 24 from storage hopper 38 and solids impeller 40, and conveyed through solids conduit line 24 to nozzle means 20. Solids conduit line 24 can deliver a fluidized solid, as well as packed solid particles.

Nozzle means 20 comprises the nozzle designated by the numeral 42 which includes a gas outlet 44 in communication with line 10, a concentric liquid outlet 46 in communication with line 22 and an outlet 48 in communication with line 24.

As more fully explained below it is not essential in respect to the operation of the present invention which of the conduit lines is adjacent the centermost gas outlet 44. Thus, the solids outlet may be adjacent to the gas outlet, with the liquid outlet disposed about it, in place of the illustrated embodiment.

The gas and the liquid outlets discharge in the same vertical plane. The gas and liquid outlets discharge into a chamber 50 which is furnished with solid particles from line 24, which may be fluidized by means of contained gas. In the illustrated nozzle embodiment, the chamber 50 is formed by press-fitting or otherwise securing the cap 52 upon the nozzle portion 54 containing liquid outlet 46, with the nozzle portion 54 engaged with the nozzle portion 55 containing the gas outlet 44; the nozzle portions 54 and 55 being so constructed and arranged that the gas and liquid outlets 44 and 46 are concentrically disposed, as heretofore noted. An O-ring 56, preferably formed of silicone polymer or other heat-resistant material, may, if necessary, be disposed within O-ring receiving recess 58 and insures a tight seal between the posterior portion of chamber 50 and the outer surface of nozzle portion 54.

A barrier 60 is spaced from outlet 48 and is fixedly secured in respect thereto by means of yoke 62 which is secured to nozzle 42.

The propellent gas is pressurized to above about 1.5 atmospheres, preferably above 1.7 atmospheres and issues through gas outlet 44 at supersonic velocity. The rapidly moving gas stream issuing from gas outlet 44 draws the liquid from liquid outlet 46 about it in a sleeve-like envelope. Within chamber 50 the liquid sleeve-like envelope encounters finely divided solid particles introduced thereto from line 24. These particles are entrained in the liquid and on the surface of the liquid envelope so that a multicomponent gas-liquid-solid mixture issues from outlet 48 in the form indicated.

The use of heated propellent gas and/or the direct heating of the liquid facilitates the aerosolization of many liquids which would otherwise be difficult to aerosolize. In some cases it is advantageous to have one of the streams appreciably cooler than the others, in order to serve as a chilling stream. This is particularly advantageous when the solidification of melted solids is sought.

As this rapidly moving mixture approaches barrier 60 it is drastically distorted from its original course, which lay generally axially in respect to the concentric outlets 44 and 46, which, due to inertial and hydrodynamic forces produces a mixture of the gas phase, the liquid phase, and the solid phase as it departs from the zone of influence of the barrier, and is transformed into a substantially radial or disc-like pattern radiating outwardly. The sleevelike mass of liquid and entrained solid particles thereupon impinges into the gas stream where maximum distortion and blending occur. The liquid is broken into very finely divided particles and depending upon the nature of the solid, it too may be further comminuted. In any event, a most intimate degree of mixing of the components of the mixture occurs, resulting in a uniform dispersal of the liquid onto the surface of the solids.

We do not wish to be bound by any theory explaining the superiority of the subject invention, but it is our belief that the superior dispersions of the subject invention result from the decelartion and shock waves arising from the impingement of the materials and gas mixture upon the barrier 60. The finely divided solid particles may be collected as such with the liquid deposited thereon, or if a relatively large amount of liquid is introduced into nozzle means 20 a slurry which has undergone a most thorough and intimate mixing will be collected.

In the embodiment of the present invention shown in FIGURE 3, another form of nozzle 70 is illustrated which may be used in accordance with the process of the present invention. For example, this nozzle embodiment may be utilized to coat finely divided solid particles of aerosol particle size dimensions upon the same or somewhat larger liquid particles. The coating of liquid aerosol particles upon the same size or somewhat larger particles of a solid is somewhat better accomplished when the liquid outlet is disposed within the solids outlet as in the embodiment of FIGURE 2. On the other hand the coating of solid particles upon finely divided aerosol liquid droplets is somewhat better accomplished by positioning the solids outlet adjacent the gas outlet with the liquid outlet disposed around the solids outlet. However, it is possible, though not preferable, by regulating the rates of flow of the liquid and solids through the nozzles to coat solid particles upon liquid droplets with the embodiment shown in FIGURES 1 and 2 and to coat liquid particles upon solid particles with the embodiment shown in FIGURE 3. It is possible to coat solids or mix liquids with liquids (such mixing including both mutually soluble and mutually insoluble liquid systems) with either the nozzle embodiment shown in FIGURES 1 and 2 or the nozzle embodiment shown in FIGURE 3.

In the embodiment of the present invention shown in FIGURE 3 only the nozzle 70 is shown, the barrier, and the solid and liquid conduit means which furnish solids and liquids to the nozzle 70 being similar to the embodiment shown in FIGURES 1 and 2.

Nozzle 70 comprises three concentric discharge conduits, namely innermost gas discharge conduit 72 having gas outlet 74, solids discharge conduit 76 having solids outlet 78, and liquid discharge conduit 80 having liquid outlet 82. The spacing and bracing of gas discharge conduit 72, solids discharge conduit 76 and liquid discharge conduit 80 may be effected by means of radial spoke-like braces, such as brace 84, which is intermediate the outer wall surface of gas discharge conduit 72 and the inner wall surface of solids discharge conduit 76, and brace 86 which is intermediate the outer wall surface of solids discharge conduit 76 and the inner wall surface of liquid discharge conduit 80. In place of the braces 84 and 86 other means, such as splines and the like, may be substituted.

In the embodiment shown in FIGURE 3 the propellent gas is pressurized to above about 1.5 atmospheres, preferably above 1.7 atmospheres and issues through gas outlet 74 at supersonic velocity. As the rapidly moving gas stream issuing from gas outlet 74, the solid particles from solids outlet 78 and the liquid from liquid outlet 82 approaches the barrier spaced from gas outlet 74 it is drastically distorted from its original course. The liquid is broken into very finely divided particles and depending upon the nature of the solid, it too may be further comminuted. A most intimate degree of mixing of the components of the mixture occurs, resulting in a uniform dispersal of the finely divided solid particles onto the surface of the liquid particles.

This invention comprehends the further steps of cooling or solidifying aerosolized melted solid particles to produce minute solid particles which are coated upon solid powders. It also comprehends simultaneously dispersing three or more separate material streams as by the use of additional concentric conduits in the embodiment shown in FIGURE 3.

In the embodiment of the present invention shown in FIGURE 4, another form of nozzle 90 is illustrated which may be used in accordance with the process of the present invention. In this embodiment, there is a center conduit 92. The outermost end portion of center conduit 92 is provided with internal splines 94 which segregate the interior of center conduit 92 into a plurality of channels, said channels being designated 96 (with but one of such channels 96 being designated in the accompanying drawings). It is a matter of choice as to the number of channels 96 which may be utilized.

The splines 94 are press-fitted into center conduit 92 and are preferably integral with a cap 102 which is longitudinally disposed to conduit 92. The outer end of cap 102 is preferably streamlined, e.g. tapered or generally conical, to permit aspiration circulation of gas from the surrounding atmosphere, as will be more fully explained below. As will be seen from FIGURE 4, the cap 102 faces and blocks the channels 96.

An annular aperture 104 is positioned intermediate the free edge 106 of cap 102 and the free edge 108 of center conduit 92.

The size dimensioning of the annular aperture 104 is critical if satisfactory aerosolization is to be accomplished. Thus, the narrowest part of the annular aperture 104 should be maintained within the size range 0.0005 to 0.030 inch. The annular aperture 104 should not vary substantially about its three hundred and sixty degrees of circularity so that an annular discharge of uniform configuration will be had.

The center conduit 92 is concentrically disposed within a conduit 110. The disposition of center conduit 92 in respect to conduit 110 is maintained by splines 112, which are external and which are for convenience integral with the conduit 92.

The interior of conduit 110 is provided with a plurality of channels 114.

The conduit 110 is provided with an inlet 120, preferably tangential, positioned in back of splines 112. The rear portion 122 of conduit 110 extends radially inwardly and is secured to center conduit 92.

Conduit 110 discharges forwardly through annular orifice 124 defined by an inwardly directed lip 126. As with the annular aperture 104, the dimensioning of annular orifice 124 is critical and should, in all cases, be between 0.0005 and 0.030 inch. The annular orifice 124 should not vary substantially about its three hundred and sixty degrees of circularity so that an annular discharge of uniform configuration will be had. Moreover, it is desirable that the inwardly directed lip 126 of conduit 110 be provided at its innermost edge 128 with as narrow a land as possible, e.g. approximate a circular knife edge. Practical machining operations prevent a satisfactory edge 128 for most materials of less than 0.008 to 0.010 inch, but where possible, this land dimension should not be exceeded.

The longitudinal spacing between the innermost edge 108 of annular aperture 104 and the innermost edge 128 of annular orifice 124 is critical to achieve optimum operation of apparatus 90. With most, if not all materials, this distance between the land of 128 and the nearest edge of annular orifice 104 should be in the range of one-fifth to three times the diameter of lip 126 at the edge 128.

As will be more fully explained below, the outer surface of the lip 126 of conduit 110 should be conical or streamlined in the manner shown in the drawings.

A conduit 130 is concentrically disposed in respect to the conduit 110 and center conduit 92. The disposition of conduit 130 in respect to conduit 110 is maintained by securing the rear portion 132 of conduit 130 to the outer surface of conduit 110. The conduit 130 is provided with an inlet 134, preferably a tangential inlet.

The discharge orifice for conduit 130 comprises annular orifice 136 defined by an inwardly directed lip 138. The annular orifice 136 is spaced to the rear of annular orifice 124. The size of the opening of annular orifice 136 should be controlled, and the narrowest portion thereof should preferably be within the range of 0.0005 inch to about 0.050 inch. The annular orifice 136 should not vary substantially about its three hundred and sixty degrees of circularity so that an annular discharge of uniform configuration will be had. It is desirable that the innermost edge 139 of lip 138 should be maintained as small as possible, but as with the innermost edge 128, it is difficult in practice to maintain an innermost edge having dimensions of less than 0.008 to 0.010 inch.

The outer surface of the lip 138 should be curved, with a gentle gradual curve provided between the outer surface of the main portion of conduit 130 and the outer surface of the lip 138. The curvature of lip 126 should comprise a continuation of the curvature of lip 138 or a conical tanget thereto.

A conduit 140 is concentrically disposed in respect to conduit 130. The disposition of conduit 140 in respect to conduit 130 is maintained by securing the rear portion 142 of conduit 140 to the outer surface of conduit 130. The conduit 140 is provided with an inlet 144, preferably a tangential inlet, as shown in the drawings.

The discharge orifice for conduit 140 comprises annular orifice 146 defined by inwardly directed lip 148. The annular orifice 146 is spaced to the rear of annular orifice 136. The size of the opening of annular orifice 146 should be controlled, and the narrowest portion thereof should preferably be within the range 0.0005 inch to about 0.050 inch. The annular orifice 146 should not vary substantially about three hundred and sixty degrees of circularity so that an annular discharge of uniform configuration will be had. It is desirable that the innermost edge 150 of lip 148 should be maintained as small as possible, but as with the innermost edges 138 and 128, it is difficult in practice to maintain an innermost edge having dimensions of less than 0.008 to 0.010 inch.

In the outermost surface of the lip 148 should be curved, with a gentle gradual curve provided between the outer surface of the main portion of conduit 140 and the outer surface of the lip 148. The curvature of lip 138 should comprise a continuation of the curvature of lip 148 or a conical tangent thereto.

The curvature of the lips 126, 138, and 148 in the manner set forth above provides for the facile passage of gas from the ambient atmosphere due to aspiration by the streams discharged from the annular orifice 124 and the annular aperture 104.

The operation of the embodiment shown in FIGURE 4 of the present invention is as follows:

Propellent gas is introduced into center conduit 92 and from inlet 120 into conduit 110. It is essential for superior performance that at least one of the gas streams, namely the gas stream discharged from center conduit 92 or the gas stream discharged from center conduit 110 be moving at a supersonic velocity when it leaves the conduit. In a preferred embodiment, both the gas stream discharged from annular aperture 104 of center conduit 92 and the gas stream discharged from annular orifice 124 of conduit 110 are discharged at supersonic velocities. In order to achieve supersonic velocities for the discharged gas stream, it is necessary that the gas from center conduit 92 and/or conduit 110 (depending upon whether one or both of the discharge streams from the conduits are moving at supersonic velocity) be pressurized at a pressure of 1.5 atmospheres or more within the conduit.

Material to be aerosolized is preferably introduced through inlet 134 into conduit 130 and discharged as a materials stream through annular orifice 136 of conduit 130.

The second materials stream is formed by material introduced through inlet 144 into conduit 140 and discharged through annular orifice 146 of conduit 140.

The gas discharged from annular aperture 104 is directed radially in the illustrated embodiment. By varying the discharge nature of annular aperture 104, the form of pattern of the gas discharge may be varied, as to a radial pattern, or a more angularly deflected pattern. The gas discharge from annular orifice 124 impinges upon the umbrella-like pattern from the annular aperture 104 which serves as a gaseous barrier. The material streams from conduits 130 and 140 pass respectively over the outer surface of lip 126 and over the outer surface of lip 138 and lip 126 within and about the gaseous sleeve issuing from orifice 124 and are aspirated with the gas from conduit 110 along the outer surface of center conduit 92 until impingement with the pattern from annular aperture 104 is had.

Aerosolization of the material streams from conduits 130 and 140 is achieved due to a number of means including the maximizing of the surface area of the material streams, the impingement of the material streams with the gaseous streams, and the mixing of the material streams with the gaseous streams.

Of importance to the resulting aerosolization is the aspiration of gas from the ambient atmosphere into and through the materials from conduits 130 and 140. Gas is aspirated into the materials undergoing aerosolization from both sides of the pattern from annular aperture 104. The streamlined shape of cap 102 and the rounded surfaces of the lips 148, 138, and 126 provide for ease of access of the aspirated gas to the materials being aerosolized. This aspirated gas acts to carry the discharging aerosol away from its relatively diminutive zone of generation into a greater volume, so that the formed aerosol particles are spaced further apart, and, accordingly, have less tendency to reagglomerate.

The present invention may be embodied in other specific forms without departing from the spirit or essential attributes thereof and, accordingly, reference should be made to the appended claims, rather than to the foregoing specification as indicating the scope of the invention.

In the appended claims "material" is meant to include a liquid, solid, or melted solid, and "dispersion" is meant to include both the coating of discrete particles of a material and the formation of slurries and mixtures of material.

We claim:

1. A process for forming a dispersion of a plurality of separate materials comprising aerosol particles, which method comprises contacting a stream of a gas moving at supersonic velocity with a coaxially enveloping stream of one material and adding to said mixture at least one additional material stream, moving said combined mixture through space, then impinging the moving combined mixture upon a barrier and deflecting it at an angle to its normal direction of movement, said deflection of the combined mixture effecting an intimate and uniform dispersion of the separate materials, with said combined mixture having a velocity sufficiently great so that upon its deflection a substantial portion of the materials is aerosolized into aerosol particles within a narrow particle size range.

2. A process in accordance with claim 1 in which the gas is heated to a temperature above the temperature of at least one of the material streams.

3. A process in accordance with claim 1 in which the gas is cooled to a temperature below the temperature of at least one of the material streams.

4. A process in accordance with claim 1 in which at least one of the material streams comprises particles of a solid of from 1 to 200 microns in size.

5. A process in accordance with claim 4, in which a plurality of the material streams comprise particles of a solid of from 1 to 200 microns in size.

6. A process in accordance with claim 4 in which one of the remaining material streams comprises a melted solid, which is aerosolized and coats the solid particles, and in which subsequent cooling of the so-coated solid particles effects the solidification of the melted solid upon the surfaces of such solid particles.

7. A process in accordance with claim 1 in which at least one of the material streams comprises a liquid.

8. A process in accordance with claim 7 in which a plurality of the material streams comprise a liquid.

9. A process in accordance with claim 1 in which at least one of the material streams comprises solid particles of from 1 to 200 microns in size and in which at least one of the other material streams comprises a liquid.

10. A process in accordance with claim 9 in which the liquid stream exceeds in volume the solids stream whereby a slurry of solid particles in the liquid will be produced.

11. A process in accordance with claim 9 in which the volume of the liquid stream is less than that which will fill the interstices between the solid particles from the solids stream so that the solid particles will be coated with the liquid.

12. A process in accordance with claim 1 in which the barrier comprises a rapidly moving gas stream opposed to the direction of movement of the gas and material streams.

13. A process in accordance with claim 1 in which each of the material streams initially comprises a coaxial envelope about the supersonically moving gas stream.

References Cited in the file of this patent

UNITED STATES PATENTS

| | | |
|---|---|---|
| 251,803 | Starkey | Jan. 3, 1882 |
| 1,799,551 | Forney | Apr. 7, 1931 |
| 1,859,992 | Seil | May 24, 1932 |
| 2,459,520 | Greenshields | Jan. 18, 1949 |
| 2,487,088 | Andrews | Nov. 8, 1949 |
| 2,561,394 | Marshall | July 24, 1951 |
| 2,738,230 | Pillard | Mar. 13, 1956 |
| 2,768,095 | Tandem et al. | Oct. 23, 1956 |
| 2,770,501 | Coanda | Nov. 13, 1956 |